United States Patent [19]

Steiner

[11] Patent Number: 5,123,713
[45] Date of Patent: Jun. 23, 1992

[54] RELEVANT VALVE TIGHTNESS CHECKING ARRANGEMENT FOR A ROAD VEHICLE ABS

[75] Inventor: Manfred Steiner, Winnenden, Fed. Rep. of Germany

[73] Assignee: Mercedes-Benz AG, Fed. Rep. of Germany

[21] Appl. No.: 650,603

[22] Filed: Feb. 5, 1991

[30] Foreign Application Priority Data

Feb. 7, 1990 [DE] Fed. Rep. of Germany ....... 4003586

[51] Int. Cl.⁵ ................................................ B60T 8/58
[52] U.S. Cl. ............................. 303/100; 303/113 SS; 303/115 PP; 303/116 R
[58] Field of Search ................... 303/113 SS, DIG. 1, 303/DIG. 2, 92, 115 PP, 116 R

[56] References Cited

U.S. PATENT DOCUMENTS 4,904,028 2/1990 Leiber et al. ................. 303/113 SS
4,948,200 8/1990 Leiber et al. ................. 303/113 SS

FOREIGN PATENT DOCUMENTS 3723875 2/1989 Fed. Rep. of Germany .

Primary Examiner—Joseph F. Peters, Jr.
Assistant Examiner—Anne E. Bidwell
Attorney, Agent, or Firm—Evenson, Wands, Edwards, Lenahan & McKeown

[57] ABSTRACT

An antilocking braking system for a road vehicle performs brake pressure control on the principle of changing the volume of an output pressure chamber of a pressure modulator connected to the wheel brake. The modulator has a control pressure chamber which is separated by a piston from the output pressure chamber into which the output pressure of an auxiliary pressure source is permanently introduced via an inlet control valve. The piston is held in its end position associated with minimal volume of the output pressure chamber. Connected in series with the inlet control valve is a non-return valve which prevents a drop in the pressure in the control pressure chamber in the event of a failure of the auxiliary pressure source. Volume increases in the output pressure chamber required for pressure reduction phases of the antilock braking control are controlled by an outlet control valve. It is possible to block off the output pressure chamber from the brake booster for the duration of antilock braking control cycles. The pressure modulator is equipped with a position sensor which generates output signals characteristic of the piston position. The modulator piston is displaced in the sense of an increase in the volume of the output pressure chamber by a resilient restoring element. With the aid of a test valve, periodic reductions in the output pressure of the auxiliary pressure source can be controlled. The piston displacements occurring as a consequence of such pressure reductions and sensed by the position sensor are signalled as an indication of leakage of the non-return valve.

16 Claims, 1 Drawing Sheet

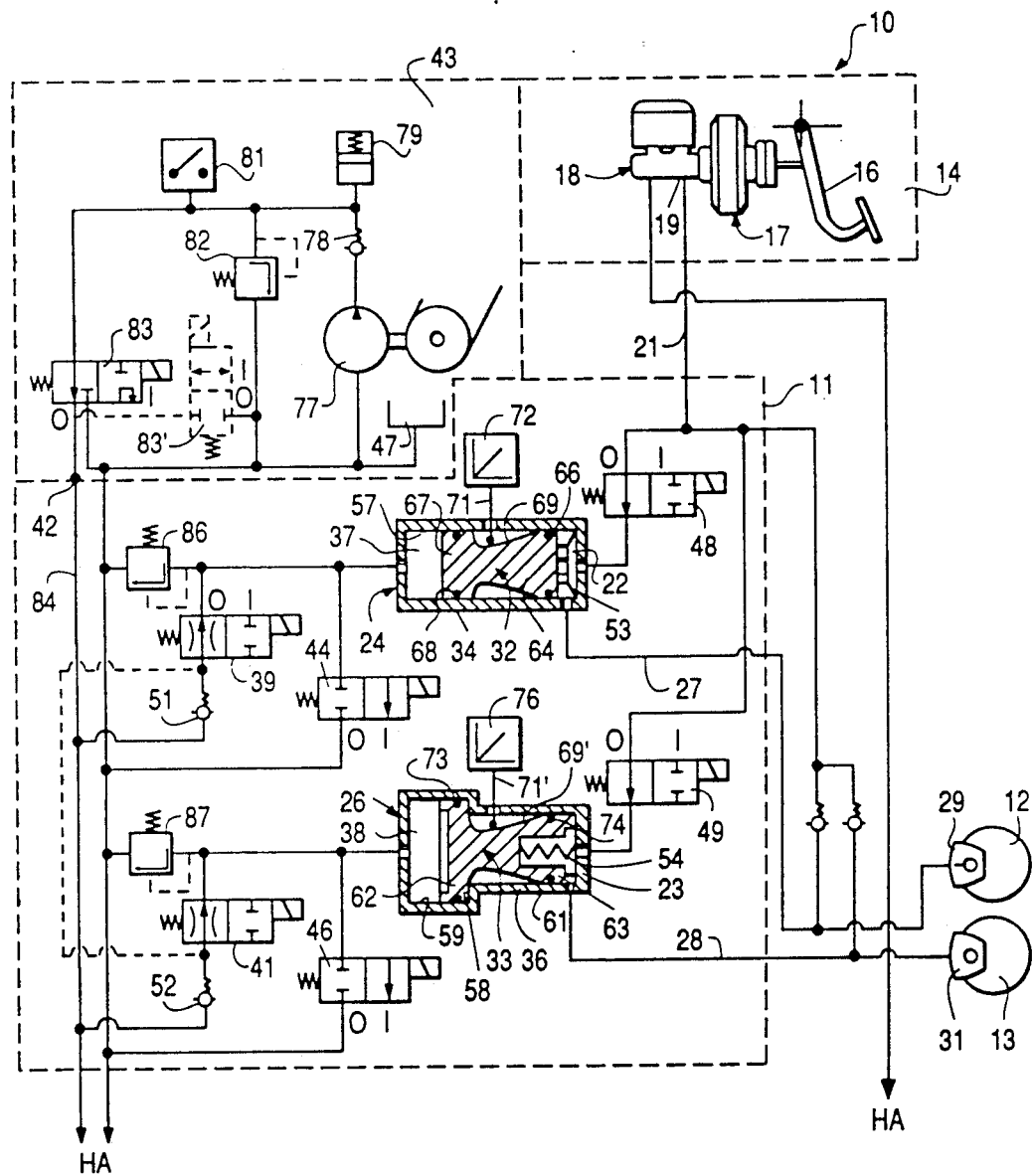

RELEVANT VALVE TIGHTNESS CHECKING ARRANGEMENT FOR A ROAD VEHICLE ABS

BACKGROUND AND SUMMARY OF THE INVENTION

The present invention relates to an arrangement for checking the tightness of a safety-relevant valve in an antilock braking system (ABS) for a road vehicle, and, more particularly, to an arrangement in which an electrically operable test valve is provided by means of which the pressure output of the auxiliary pressure source can be connected to the pressureless reservoir of the auxiliary pressure source to achieve a pressure drop in the pressure supply line leading to a pressure modulator.

An arrangement is shown in DE 37 23 875 A1 in connection with an antilock braking system in which the wheel brakes which can be subjected individually or jointly to an antilock braking control are connected to a volume-variable output pressure chamber of a pressure modulator such that, while the output pressure chamber is blocked off from the brake booster of the brake system, a pressure reduction in the connected wheel brake can be achieved by increasing the volume of the output pressure chamber. The output pressure chamber of the pressure modulator is pressure-tightly separated off movably by a piston from a control pressure chamber, into which the high output pressure of an auxiliary pressure source is permanently introduced via an inlet control valve. This pressure urges the modulator piston into its one end position associated with minimal volume of the output pressure chamber and is held in this position which is assigned to normal braking operation. A non-return valve, which prevents a drop in the pressure in the control pressure chamber in the event of a brief failure of the auxiliary pressure source, is connected in series with the inlet control valve. An outlet control valve permits the basic position of which is its blocking position, the control pressure chamber of the pressure modulator to be relieved with respect to the pressureless reservoir of the auxiliary pressure source, as a result of which pressure reduction phases of the antilock braking control can be controlled. The pressure modulator is provided with a prestressed restoring spring which acts on the modulator piston in the sense of a displacement of the piston, bringing about an increase in the volume of the output pressure chamber.

It is possible, however, for the modulator piston to be held in its end position corresponding to minimal volume of the output pressure chamber by the auxiliary pressure introduced into the control pressure chamber, against the restoring force of the spring and against the brake pressure which can be introduced into the output pressure chamber by the brake booster. Furthermore, a position sensor monitoring the position of the modulator piston is provided and generates electric output signals characteristic of the piston position and changes of that position.

On the basis of these output signals of the position sensor, through suitably controlled test cycles, it is possible to detect malfunctioning states of an ABS control valve designed as a solenoid valve as well as of the inlet control and the brake pressure control valves, possibly even to detect a sluggishness of the pressure modulator piston. No checking is, however, possible of the non-return valve which is intended to hold the pressure in the control pressure chamber of the pressure modulator in the event of a failure of the auxiliary pressure source.

Therefore, the known arrangement is disadvantageous in that, in the event of a leakage of the non-return valve and a simultaneous failure of the auxiliary pressure source, a failure of the brake circuit may occur, which failure is highly problematical for safety reasons, especially since a leakage of this safety non-return valve cannot be detected as long as the auxiliary pressure source is intact.

An object of the invention is therefore to improve an arrangement of the generally known type such that a leakage of the non-return valve connected between the pressure output of the auxiliary pressure source and the control pressure chamber of the pressure modulator can be reliably detected.

This object has been achieved according to the present invention by providing an electrically operable test valve for connecting the pressure output of the auxiliary pressure source to the pressureless reservoir of the auxiliary pressure source to achieve a pressure drop in the pressure supply line leading to the pressure modulator.

By virtue of this test valve which can be switched over, for example at regular time intervals for short test periods, into its functional position bringing about the pressure drop in the control pressure chamber, a piston displacement caused by a leakage of the safety non-return valve during a test cycle can be detected in a simple way and the output signal of the displacement sensor triggered for this can be used as a leak-indicator signal. The gain in safety achieved as a result is considerable.

Structurally simple alternative configuration of the resilient non-return element provided as part of the pressure modulator can include a prestressed coil restoring spring accommodated over part of its length by a control blind core of a modulator piston, and also a cup restoring spring supported on the face wall of the piston and on an end face wall of the modulator housing.

In another embodiment of the present invention, for two pressure modulators, each assigned to one of the wheel brakes of a brake circuit of the vehicle, only one position sensor is required on one of the pressure modulators. To this extent, a reduction in technical complexity is achieved.

A particularly simply design of the test valve as a 2/2-way solenoid valve is possible, however, whenever the auxiliary pressure source operates at a relatively low output pressure level. In this case, a particularly favorable configuration of the pressure modulator is as a pressure intensifier with a piston stage of greater diameter movably limiting the control pressure chamber, and a piston stage of a smaller diameter which movably limits the output pressure chamber of the pressure modulator.

BRIEF DESCRIPTION OF THE DRAWING

These and further objects, advantages and features of the present invention will become more apparent from the following detailed description of presently preferred embodiments when taken in conjunction with the accompanying sole figure which is a schematic view of a functional part, assigned to the front axle brake circuit I, of a hydraulic dual-circuit brake system.

DETAILED DESCRIPTION OF THE DRAWING

The functional part assigned to the front axle brake circuit I for a road vehicle is designated generally by the numeral 10. The vehicle is equipped with an antilock braking system (ABS), denoted generally by the numeral 11, for which only the functional elements of its hydraulic unit which are assigned to the front wheel brakes 12 and 13 are represented.

The brake booster, denoted generally by the numeral 14, of the brake system 10 is assumed, for the purposes of explanation, to be a tandem master cylinder 18, which can be operated by a brake pedal 16 via a brake power assist unit 17. The pressure output 19 of the unit 17 communicates with the primary output pressure chamber of the tandem-master cylinder 18 and is connected with the main brake line 21 of the front axle brake circuit I.

The ABS 11 operates on the principle of changing the brake pressure at the wheel brakes 12 and 13 which can be subjected to control by changing the volume of output pressure chambers 22 and 23 of conventional pressure modulators 24 and 26, respectively, assigned individually to the front wheel brakes 12 and 13. These output pressure chambers 22, 23 of the two pressure modulators 24, 26 are connected in each case via a wheel brake line 27 and 28, respectively, directly to the caliper 29 of the left-hand front wheel brake 12 and to the caliper 31 of the right-hand front wheel brake 13, respectively.

The output pressure chambers 22 and 23 of the two pressure modulators 24 and 26 are separated in each case by a modulator piston 32 and 33, respectively, which is pressure-tightly displaceable in the housing 34 or 36 of the respective pressure modulator 24 or 26, from a control pressure chamber 37 and 38, respectively, which can each be connected via an inlet control valve 39 and 41, respectively, to the high-pressure output 42 of an auxiliary pressure source, denoted generally by the numeral 43, or alternatively can be blocked off from this high-pressure output 42 and can be blocked off or relieved with respect to the pressureless reservoir 47 of the auxiliary pressure source 43 via an outlet control valve 44 and 46, respectively.

The output pressure chamber 22 of the pressure modulator 24 assigned to the left-hand front wheel brake 12 is connected via a function control valve 48 to the pressure output 19 of the master cylinder 18; similarly, the output pressure chamber 23 of the pressure modulator 26 assigned to the right-hand front wheel brake 13 is connected via another function control valve 49. These function control valves 48 and 49 are 2/2-way solenoid valves, the basic position 0 of which is their through-flow position, in which the pressure output 19 of the master cylinder 18 is connected to the output pressure chamber 22 or 23 of the pressure modulator 24 and 26, respectively, to which the respective front wheel brakes 12 and 13 are also connected. The energized position I of the function control valves 48 and 49 which is assumed upon energizing of their control solenoids with an ABS control signal of a known electronic control unit (not shown) is their respective blocking position which these function control valves 48 and 49 assume for the duration of an antilock braking control cycle.

According to a first embodiment of the ABS 11, represented in solid lines, the inlet control valves 39 and 41 are each connected via a non-return valve 51 and 52, respectively, to the pressure output 42 of the auxiliary pressure source 43. The inlet control valves 39 and 41 are 2/2-way solenoid valves which have a through flow position as the basic position 0 and a blocking position as the energized position I.

The outlet control valves 44 and 46 are likewise 2/2way solenoid valves which have a blocking position as the basic position 0 and a through-flow position as the energized position I. The basic positions of the inlet control valves 39 and 41, as well as the basic positions 0 of the outlet control valves 44 and 46, are assigned to the normal braking operation of the brake system 10, i.e., are not subjected to an antilock braking control. In this operating state, the high output pressure of the auxiliary pressure source 43 is thus introduced, via the non-return valves 51 and 52 which are actuated in the opening direction by higher pressure at the output 42 of the auxiliary pressure source than in the control pressure chamber 37 or 38 of the pressure modulator 24 and the pressure modulator 26, respectively, as well as via the inlet control valves 39 and 41, into the control pressure chambers 37 and 39 of the two pressure modulators 24 and 26. The modulator pistons 32 and 33 are thus urged into their end positions, respectively, associated with minimal volume of the output pressure chambers 22 and 23.

The pressure modulators 24, 26 and the auxiliary pressure source 43 are configured such that, in normal braking operation, the modulator pistons 32 and 33 are held in the end positions associated with minimal volume of the output pressure chambers 22 and 23 against the output pressure of the brake booster 14 introduced into their output pressure chambers 22 and 23 and against the restoring force of resilient restoring elements 53 and 54, respectively, which act on the modulator pistons 32 and 33 with the tendency of displacing the modulator pistons 32 and 33 in the sense of an increase in the volumes of the output pressure chambers 22 and 23.

To explain other embodiments of the pressure modulators 24 and 26, a configuration of the pressure modulator 24 assigned to the left-hand front wheel brake 12 is represented which is suitable if the output pressure level of the auxiliary pressure source 43 is high enough, i.e., that much higher than the maximum brake pressure which can be generated at the pressure output 19 of the brake booster 14, that the modulator piston 32 can also fully compress the resilient restoring element 53 which is configured here as a cup spring. Assuming such an adequately high output pressure level of the auxiliary pressure source 43, the piston areas of the modulator piston 32 bringing about the movable limitations of the control pressure chamber 37 and of the output pressure chamber 22 can be the same size, and the housing 34 of the pressure modulator 24 can be simply configured in the form of a circular-cylinder with a continuous cylindrical bore 57 which is closed off at each end by end face walls which form axially fixed limitations with respect to the housing of the control pressure chamber 37 and of the output pressure chamber 22.

For the pressure modulator 26 assigned to the right-hand front wheel brake 13, a configuration is shown which is suitable if the output pressure level of the auxiliary pressure source 43 is distinctly lower than the maximum brake pressures which can be generated at the output 19 by the brake booster 14. Accordingly, the pressure modulator 26 is a pressure intensifier which brings about a boost in the auxiliary pressure provided at the output 42 of the auxiliary pressure source 43 at a low level to the necessary level. This boost keeps the modulator piston 33 in the end position associated with minimal volume of the output pressure chamber 23 even against the brake pressure introduced into the output pressure chamber 23 and the restoring force of the resilient restoring element which here is configured as a prestressed coil spring accommodated over part of its length by a blind bore of the modulator piston 33.

The pressure modulator 26 has two housing bores 59 and 61 of different diameters, set off from each other by and merging at a housing step 58. The modulator piston 33 is guided in a pressure-tightly displaceable manner by piston stages 62 and 63 of correspondingly different diameters. The axially movable limitation of the control pressure chamber 38 is formed by the piston stage 62 of greater diameter and its axially fixed limitation with respect to the housing is formed by an end face wall of the modulator housing 36 which terminates the housing bore 59. The axially movable limitation of the output pressure chamber 23 of the pressure modulator 26 is constituted by the piston stage 63 of smaller diameter. The dimensioning of the modulator 26 to this extent corresponds to the pressure modulator 24 represented for the right-hand front wheel brake 12.

The end section 64 of the piston 32 of the modulator 24 represented for the left-hand front wheel brake 12, directly limiting its output pressure chamber 22, is sealed off from the housing bore 57 by a ring seal 66 fixed to the piston. Similarly, an end section 67 directly limiting the control pressure chamber 37 of this pressure modulator 24 is sealed off from the housing bore 57 by a second ring seal 68 fixed to the piston. Between these two piston end sections 64 and 67, the modulator piston 32 has a conical taper 69, on which, as indicated only diagrammatically, a radial actuating pin 71 of a position sensor 72 is supported within the possible displacement travel of the piston 32. The sensor 72 generates an electric output signal characteristic of the position of the piston 32.

The piston 33 of the pressure modulator 26 represented for the right-hand front wheel brake 13 is also provided between its piston stage 62, limiting the control pressure chamber 38 axially movably and sealed off from the bore stage 59 by a ring seal 73, and its piston stage 63, limiting the output pressure chamber 23 axially movably and sealed off from the smaller bore stage 61 of the modulator housing 63 by a ring seal 74, with a corresponding conical taper 69'. A radial actuating pin 71 of a position sensor 76 is supported on the conical taper 69' and generates an electric output signal characteristic of the position of the piston 33 of the pressure modulator 26.

With the general construction of the ABS 11 now explained, brake pressure reducing, holding and restoring phases of an antilock braking control can be controlled in the following manner. It is assumed for the following explanation that there occurs at the left-hand front wheel a locking tendency which requires a brake pressure reduction at the front wheel brake 12 and which the electronic control unit (not shown) and sensing equipment of the ABS recognizes on the basis of the output signals from wheel speed sensors assigned to the vehicle wheels. The sensors generate electric output signals which, according to level and/or frequency, contain information on the dynamic behavior of the vehicle wheels.

On detecting the situation requiring control, the function control valve 48 is switched over into its blocking position I. As a result, the valve 48 blocks off the pressure modulator 24 from the master cylinder 18. At the same time or with a slight delay, the inlet control valve 39 is switched over into its blocking position I and the outlet control valve 44 is switched over into its through-flow position I, so that the control pressure chamber 37 of the pressure modulator 24 is then pressure-relieved with respect to the reservoir 47 of the auxiliary pressure source 43 and the modulator piston 32 can execute a displacement to increase the volume of the output pressure chamber 22, whereby the brake pressure in the left-hand front wheel brake 12 drops. The pressure modulator 24 is dimensioned such that a complete brake pressure reduction in the caliper 29 of the wheel brake 12 is possible with a single pressure reduction stroke of the modulator piston 32 even when the brake had received the maximum brake fluid volume possible in strong braking.

If the locking tendency already subsides after the modulator piston 32 has only executed part of its pressure reduction stroke while the inlet control valve 39 remains in its blocking position I, the outlet control valve 44 is switched back into its blocking position 0, whereby the modulator piston 32 remains in its then reached position and a brake pressure holding phase is initiated. If the locking tendency subsides further so that the brake pressure in the wheel brake 12 subjected to control can be increased again, the inlet control valve 39 is again switched back into its through-flow position 0, in which is develops a throttling effect. Control pressure is again introduced into the control pressure chamber 37 of the pressure modulator 24 to displace the piston 32 again for brake pressure build-up in the wheel brake 12.

In exactly the same manner, brake pressure reducing, holding and restoring phases are controlled at the right-hand front wheel brake 13 by the pressure modulator 26 and its hydraulic peripherals. It also is possible for the control at the two front wheel brakes 12 and 13 to be in phase-opposition, i.e. brake pressure can be reduced at one front wheel brake while brake pressure is again built up at the other front wheel brake.

A pressure switch 81 which monitors the pressure in a pressure accumulator 79 and controls the charging operation of a pump 77 can be provided as part of the auxiliary pressure source 43 which is effected in a known way with the pressure accumulator 79 which can be charged by the pump 77 via a non-return valve 78. A pressure limiting valve 82 which limits the output pressure level of the auxiliary pressure source 43 to a maximum value is connected to a test valve 83, by way of which the pressure output 42 of the auxiliary pressure source 43, kept permanently at a high output pressure level, is connected to the reservoir 47 of the auxiliary pressure source 43, for brief test periods which are repeated at regular time intervals and may take place outside (independently of) a braking action, so that the pressure in the pressure supply line 84 connected to the non-return valves 51 and 52 drops. In the event of a leakage of one or both non-return valves 51, 52, a pressure drop then occurs in the pressure control chamber 37, 38 of the pressure modulator 24 and 26, respectively, with the consequence that the respective resilient restoring element 53 and/or 54 pushes the modulator piston 32 and 33, respectively, back a little and the respective displacement sensor 72 or 76 generates an output signal change characteristic thereof. On that basis, it can be detected whether and which one of the two non-return valves 51 and 52 is leaking.

The test valve 83 represented in solid lines in the figure is a 3/2-way solenoid valve, in the basic position 0 of which the pressure accumulator 79 of the auxiliary pressure source 43 is connected to its pressure output 42 and is blocked off from its reservoir 47 and in the energized position I of which, i.e. the test position, the pressure accumulator 79 is blocked off from the pressure output 42 of the auxiliary pressure source 43 but is connected to its reservoir 47. Alternatively, there may be provided as part of the auxiliary pressure source 43, as shown in dash lines, as test valve 83', a 2/2-way solenoid valve, in the basic position 0 of which the pressure output 42 of the auxiliary pressure source 43, then permanently connected to the pressure accumulator 79, is blocked off from its reservoir 47, and in the energized position I of which, the test position, the pressure output 42 of the auxiliary pressure source 43 is connected to its reservoir 47.

With the simpler test valve 83' configuration, a pressure drop in the pressure supply line 84 suitable for the test is achieved irrespective of an activation of the pump 77.

The unillustrated functional part of the antilock braking system 11 provided for the rear wheel brakes of the road vehicle may be similarly designed as the functional part of the above-described antilock braking system 11 provided for the front wheel brakes 12 and 13. In other words, the rear wheel brakes functional part can be realized by two pressure modulators, or else only with a single pressure modulator, to the output pressure chamber of which the rear wheel brakes are each connected in a known hydraulic circuit arrangement via a brake pressure control valve which are expediently configured as simple 2/2-way solenoid valves, the basic position 0 of which is the through-flow position assigned to brake pressure build-up and brake pressure reduction operation, both in the case of a normal braking action and in the case of a braking action subjected to control, and the energized position I of which is the blocking position assigned to the brake pressure holding phases of the antilock braking control.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed:

1. A system for checking the tightness of a safety-relevant valve in an antilock braking system for a road vehicle with hydraulic multiple circuits, comprising an auxiliary pressure source having a pressureless reservoir; a pressure modulator which controls brake pressure by changing the volume of an output pressure chamber of the pressure modulator connected to a wheel brake to be controlled and which includes a piston separating the output pressure chamber from a control pressure chamber in a pressure-tightly movable manner, which piston is urged by valve-controlled pressurization of the control pressure chamber under a output pressure of the auxiliary pressure source into one end position associated with minimal volume of the output pressure chamber and assigned to normal braking operation unsubjected to an antilock braking control and displaceable by valve-controlled pressure relief of the control pressure chamber for an increase in the output pressure chamber in order to reduce brake pressure in the wheel brake connected to the modulator; an inlet valve for introducing pressure into the control pressure chamber; a non-return valve connected between a control connection of the control pressure chamber and the output pressure of the auxiliary pressure source hydraulically in series with the inlet control valve bringing about the pressure introduction into the control pressure chamber, the non-return valve being blocked by relatively higher pressure in the control pressure chamber of the pressure modulator than at the output of the auxiliary pressure source; an outlet control valve blocking the control pressure chamber in its basic position and in its open position relieving the control pressure chamber with respect to the pressureless reservoir of the auxiliary pressure source; the pressure modulator further including a prestressed restoring spring acting on the modulator piston for displacement of the piston bringing about an increase in the volume of the output pressure chamber while allowing the modulator piston to be held in its end position corresponding to minimal volume of the output pressure chamber by the auxiliary pressure introduced into the control pressure chamber against the restoring force of the spring and against the brake pressure which can be introduced by the brake booster into the output pressure chamber; a position sensor for monitoring the position of the modulator piston and generating an electric output signal characteristic at least of changes of the piston position; and an electrically operable test valve for selectively connecting the pressure output of the auxiliary pressure source to the pressureless reservoir of the auxiliary pressure source to achieve a pressure drop in the pressure supply line leading to the pressure modulator.

2. The system according to claim 1, wherein brake fluid volume which is received by the pressure modulator is dimensioned adequately to reduce the brake pressure in the wheel brake connected to the pressure modulator completely in one stroke of the piston, and the restoring spring is a prestressed coil spring accommodated over part of its length by a central blind bore of the modulator piston.

3. The system according to claim 1, wherein the restoring spring is a cup spring supported at a face wall of the piston for movably limiting the output pressure chamber of the pressure modulator, and also at an end face wall of the modulator housing for forming a fixed axial limitation with respect to the housing of the output pressure chamber.

4. The system according to claim 1, wherein two pressure modulators are each assigned to one of two wheel brakes of a brake circuit, a common non-return valve is arranged upstream of pressure inlet control valves, and only one of the two pressure modulators is equipped with a position sensor.

5. The system according to claim 4, wherein brake fluid volume which is received by the pressure modulator is dimensioned adequately to reduce the brake pressure in the wheel brake connected to the pressure modulator completely in one stroke of the piston, and the restoring spring is a prestressed coil spring accommodated over part of its length by a central blind bore of the modulator piston.

6. The system according to claim 5, wherein the restoring spring is a cup spring supported at a face wall of the piston for movably limiting the output pressure chamber of the pressure modulator, and also at an end face wall of the modulator housing for forming a fixed axial limitation with respect to the housing of the output pressure chamber.

7. The system according to claim 1, wherein a 2/2-way solenoid valve is operatively-arranged in the system as a test valve.

8. The system according to claim 7, wherein brake fluid volume which is received by the pressure modulator is dimensioned adequately to reduce the brake pressure in the wheel brake connected to the pressure modulator completely in one stroke of the piston, and the restoring spring is a prestressed coil spring accommodated over part of its length by a central blind bore of the modulator piston.

9. The system according to claim 8, wherein the restoring spring is a cup spring supported at a face wall of the piston for movably limiting the output pressure chamber of the pressure modulator, and also at an end face wall of the modulator housing for forming a fixed axial limitation with respect to the housing of the output pressure chamber.

10. The system according to claim 9, wherein two pressure modulators are each assigned to one of two wheel brakes of a brake circuit, a common non-return valve is arranged upstream of pressure inlet control valves, and only one of the two pressure modulators is equipped with a position sensor.

11. The system according to claim 1, wherein the pressure modulator is a pressure intensifier with a piston stage of greater diameter movably limiting the control pressure chamber and a piston stage of a smaller diameter movably limiting the output pressure chamber of the pressure modulator.

12. The system according to claim 11, wherein brake fluid volume which is received by the pressure modulator is dimensioned adequately to reduce the brake pressure in the wheel brake connected to the pressure modulator completely in one stroke of the piston, and the restoring spring is a prestressed coil spring accommodated over part of its length by a central blind bore of the modulator piston.

13. The system according to claim 12, wherein the restoring spring is a cup spring supported at a face wall of the piston for movably limiting the output pressure chamber of the pressure modulator, and also at an end face wall of the modulator housing for forming a fixed axial limitation with respect to the housing of the output pressure chamber.

14. The system according to claim 13, wherein two pressure modulators are each assigned to one of two wheel brakes of a brake circuit, a common non-return valve is arranged upstream of pressure inlet control valves, and only one of the two pressure modulators is equipped with a position sensor.

15. The system according to claim 14, wherein a 2/2-way solenoid valve is operatively-arranged in the system as a test valve.

16. A method for checking the tightness of a safety-relevant valve in a road vehicle antilock braking system with hydraulic multiple circuits, comprising the steps of:
controlling brake pressure by changing volume of an output pressure chamber of the pressure modulator connected to wheel brakes to be controlled;
urging a piston in the pressure modulator separating the output chamber from a control pressure chamber by valve-controlled pressurization of the control pressure chamber under output pressure of an auxiliary pressure source into an end position representing minimum volume of the output pressure chamber and normal braking operating unsubjected to antilock braking control;
displacing the piston by valve-controlled pressure relief of the control pressure chamber to reduce brake pressure in the wheel brakes connected to the pressure modulator;
connecting the control pressure chamber and the output pressure of the auxiliary pressure source hydraulically in series via a non-return valve;
introducing pressure into the control pressure chamber via an inlet valve;
blocking the non-return valve by relatively higher pressure in the control pressure chamber of the pressure modulator than at the output of the auxiliary pressure source;
blocking an outlet control valve in a basic position and in its open position relieving the control pressure chamber with respect to a pressureless reservoir of the auxiliary pressure source;
displacing the piston of the pressure modulator for bringing about an increase in volume of the output pressure chamber while holding the piston in the end position corresponding to minimal volume of the output pressure chamber by introducing auxiliary pressure into the control pressure chamber against force of a restoring spring and against brake pressure introduced into the output pressure chamber;
monitoring the position of the piston;
generating a signal characteristic of changes in position of the piston; and
selectively connecting the pressure output of the auxiliary pressure source to the pressureless reservoir of the auxiliary pressure source to achieve a pressure drop in a pressure supply line communicating with the pressure modulator.

* * * * *